(12) United States Patent
Weston et al.

(10) Patent No.: US 9,911,266 B2
(45) Date of Patent: *Mar. 6, 2018

(54) MULTIMODE RETAIL SYSTEM (71) Applicant: Dresser, Inc., Austin, TX (US)

(72) Inventors: Timothy Martin Weston, Cedar Park, TX (US); Weiming Tang, Austin, TX (US); David Spiller, Cumming, GA (US)

(73) Assignee: Wayne Fueling Systems LLC, Austin, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/297,711

(22) Filed: Jun. 6, 2014

(65) Prior Publication Data

US 2014/0289133 A1  Sep. 25, 2014

Related U.S. Application Data (63) Continuation of application No. 13/170,263, filed on Jun. 28, 2011, now Pat. No. 8,788,428.

(Continued)

(51) Int. Cl.
*G07F 7/10* (2006.01)
*G06F 21/55* (2013.01)
(Continued)

(52) U.S. Cl.
CPC .......... *G07F 7/1016* (2013.01); *G06F 21/554* (2013.01); *G06Q 20/4012* (2013.01);
(Continued)

(58) Field of Classification Search
CPC ... G06F 21/55; G06F 21/554; G06Q 20/1085; G06Q 20/18; G06Q 20/4012;
(Continued)

(56) References Cited

U.S. PATENT DOCUMENTS 5,970,146 A   10/1999  McCall et al.
6,055,521 A   4/2000   Ramsey et al.
(Continued)

FOREIGN PATENT DOCUMENTS

WO   WO-0039951 A1    7/2000
WO   WO-06034713 A1   4/2006
WO   WO-12006076 A1   1/2012

*Primary Examiner* — Theodore C Parsons
(74) *Attorney, Agent, or Firm* — Mintz Levin Cohn Ferris Glovsky and Popeo, P.C.

(57) ABSTRACT

A multimode system for receiving data in a retail environment includes: a secure input module for receiving high security input and low security input from a customer, the high security input to be communicated by the secure input module in cipher text, and the low security input to be communicated by the secure input module in plaintext. The multimode system is adapted to operate in a high security mode and a low security mode. The multimode system is adapted to enter the low security mode upon detection by the multimode system of a security breach condition. In the high security mode, the secure input module accepts low security input and high security input. In the low security mode, the secure input module accepts the low security input and does not accept the high security input.

21 Claims, 4 Drawing Sheets

Related U.S. Application Data (60) Provisional application No. 61/359,095, filed on Jun. 28, 2010.

(51) Int. Cl.
*G06Q 20/40* (2012.01)
*G06Q 50/06* (2012.01)

(52) U.S. Cl.
CPC ........... *G06Q 50/06* (2013.01); *G07F 7/1033* (2013.01); *G07F 7/1091* (2013.01)

(58) Field of Classification Search
CPC ..... G06Q 50/06; G07F 7/1016; G07F 7/1033; G07F 7/1091
See application file for complete search history.

(56) References Cited

U.S. PATENT DOCUMENTS

| | | | |
|---|---|---|---|
| 6,152,591 A | 11/2000 | McCall et al. | |
| 7,640,185 B1 | 12/2009 | Giordano et al. | |
| 2002/0016780 A1* | 2/2002 | Shah | G06Q 30/02 705/410 |
| 2002/0194495 A1* | 12/2002 | Gladstone | G06F 21/55 726/22 |
| 2003/0075600 A1* | 4/2003 | Struthers | B67D 7/106 235/381 |
| 2004/0024710 A1 | 2/2004 | Fernando et al. | |
| 2005/0211766 A1* | 9/2005 | Robertson | G06Q 20/3674 235/380 |
| 2006/0265736 A1 | 11/2006 | Robertson et al. | |
| 2007/0033398 A1 | 2/2007 | Robertson et al. | |
| 2007/0265733 A1 | 11/2007 | Harrell | |
| 2008/0316357 A1 | 12/2008 | Achari et al. | |
| 2009/0119221 A1* | 5/2009 | Weston | G06Q 20/382 705/76 |
| 2009/0198803 A1 | 8/2009 | Meckenstock et al. | |
| 2010/0071077 A1* | 3/2010 | Morris | G06F 21/86 726/36 |
| 2011/0076986 A1* | 3/2011 | Glendinning | G06F 21/88 455/411 |
| 2011/0185319 A1 | 7/2011 | Carapelli | |
| 2013/0276113 A1* | 10/2013 | Dalcher | G06F 11/00 726/23 |

* cited by examiner

MULTIMODE RETAIL SYSTEM

CROSS-REFERENCE TO RELATED APPLICATION

This application is a continuation of U.S. application Ser. No. 13/170,263 entitled "Multimode Retail System", filed Jun. 28, 2011 which is a U.S. Non-Provisional application of U.S. Provisional Application No. 61/359,095, entitled "Multimode Retail System", filed Jun. 28, 2010, which is herein incorporated by reference in its entirety.

TECHNICAL FIELD

This disclosure relates to a system and method for operating a fuel dispenser input module, and more particularly to operating a fuel dispenser secure input module in multiple security modes.

BACKGROUND

In recent years, retail environments have evolved into elaborate point-of-sale (POS) facilities providing a wide variety of customer services, such as fuel dispensing, car washing, ATM access, money order access, and credit/debit card transactions. Additionally, it has become desirable to offer advertisements and additional sales to customers from third party venders at the retail environments. However, there has not been an ideal system or method available to retailers providing these additional capabilities without raising a significant risk of unauthorized access.

In a traditional retail environment, card data supplied from a customer purchasing products or services is transmitted in an unprotected form from the input system to the POS system, and from the POS system to a network host which performs authentication of the card data. This design allows unauthorized parties to easily intercept customer card data by tampering with the transmission line, especially if the transmission line is Ethernet or a satellite link.

As unauthorized access has become an increasing problem, a number of government and industry agencies have begun proposing stricter guidelines and requirements for retail environment security. One type of enhanced security restriction is the physical requirement that displays within retail environments should directly interface with a secure module in order to allow the secure module to control the PIN entry device (PED). Another security requirement is that the PED must control the prompts that request the entry of PINs and clear-text data. Further, the PED must set a direct interface between the PED keypad and the secure module when a prompt requests the entry of a PIN or other clear-text data. Once the direct interface is set, these PEDs must either (1) be able to cryptographically authenticate all prompts that request the entry of PINs and clear-text data originating from the POS terminal before being displayed or (2) store the prompts in the PED to prevent them from being modified. The idea behind these requirements is that they would synchronize the display on the screen to the state of the PED, thus preventing attacks such as where the PED is in a clear-text data entry mode while the PED displays a command requesting the entry of secure information. In these situations, the customer would enter his or her PIN at a time when the PED would not encrypt the data, thus leading to potential PIN exposure to unauthorized parties.

These requirements leave solution providers with two undesirable options. In the first, the retail environment must have two displays—one for the normal retail environment interface/video that is not "secured," and another display which would be directly connected to the PED and would only perform PIN/secure prompt functions. This solution is undesirable because it is likely to cause customer confusion and could lead to the multiple screens becoming out of sync. The second solution is to redesign the existing retail environments with a secure chip controlling the display. A major downside to this solution is the loss of enhanced video display support because the video accelerator required for the enhanced video display would not be a secure chip. Additionally, software for the new platform would require an expensive and time-consuming redesign, adding significant cost and complexity to the system while simultaneously reducing the functionality available to and required by customers.

A PED that functions to receive both PINs and clear-text data can be configured to encrypt PIN information, and pass clear-text data in clear-text form. A PED of such type can provide a customer with a single interface for entering alpha-numeric information regardless of the security policy associated with information.

SUMMARY

In one general embodiment, a multimode system for receiving data in a retail environment includes: a secure input module for receiving high security input and low security input from a customer, the high security input to be communicated by the secure input module in cipher text, and the low security input to be communicated by the secure input module in plaintext. The multimode system is adapted to operate in a high security mode and a low security mode. The multimode system is adapted to enter the low security mode upon detection by the multimode system of a security breach condition. In the high security mode, the secure input module accepts low security input and high security input. In the low security mode, the secure input module accepts the low security input and does not accept the high security input.

In some aspects of the general embodiment, the low security mode may be selected from a plurality of low security modes.

In some aspects of the general embodiment, the multimode system may further include a non-secure input module which accepts low security input in the low security mode and in the high security mode.

In some aspects of the general embodiment, the multimode system may further include a second secure input module which accepts low security input and high security input in the low security mode and in the high security mode.

In some aspects of the general embodiment, the multimode system may further include a customer display which displays a limited function message to customers when the multimode system is in the low security mode.

In some aspects of the general embodiment, the limited function message may include instructions to initiate a transaction at another location.

In some aspects of the general embodiment, the limited function message may include a listing of payment types that are disabled in the low security mode.

In some aspects of the general embodiment, the high security input may include a personal identification number.

In another general embodiments, a method for operating a multimode system in a retail environment includes: operating in a high security mode in which a secure input module accepts low security input and high security input, the low security input to be communicated by the secure input module in plaintext and the high security input to be communicated by the secure input module in ciphertext; detecting a security breach condition; and in response to the detecting, operating in a low security mode in which the secure input module accepts the low security input and does not accept the high security input.

Some aspects of the general embodiment may further include selecting the low security mode from a plurality of low security modes.

Some aspects of the general embodiment may further include operating a non-secure input module which accepts low security input in the low security mode and in the high security mode.

Some aspects of the general embodiment may further include operating a second secure input module which accepts low security input and high security input in the low security mode and in the high security mode.

Some aspects of the general embodiment may further include operating a customer display which displays a limited function message to customers when the multimode system is in the low security mode.

In some aspects of the general embodiment, the limited function message may include instructions to initiate a transaction at another location.

In some aspects of the general embodiment, the limited function message may include a listing of payment types that are disabled in the low security mode.

In some aspects of the general embodiment, the high security information may include a personal identification number.

In another general embodiment, a fuel dispenser includes: a secure payment module (SPM); and a controller, wherein at least one of the SPM and the controller is communicably coupled or includes a processor and a tangible memory. The memory stores software comprising instructions operable to be executed by the processor to perform operations including: detect a tamper event of the SPM; initiate an adjustment of the SPM from a high security mode to a low security mode, wherein the SPM is operable to accept confidential customer information and non-confidential customer information in the high security mode and the SPM is operable to accept only non-confidential customer information in the low security mode.

In another general embodiment, a fuel dispenser includes: a secure payment module (SPM) including a secure keypad; and a secure processor. The SPM is operable to function in at least two modes. The SPM is operable to process non-debit and debit transactions in a first mode, the SPM operable to process only non-debit transactions in a second mode. The SPM is operable to switch from the first to second mode in response to a tamper event.

Various embodiments of a secure input module according to the present disclosure may have one or more of the following features. For example, the secure input module may provide for a single input device facilitating security controlled input of both encrypted and clear text data. The secure input module may also provide for display prompt control synchronized with an input mode to prevent "spoofing" a customer into providing sensitive data when a terminal (e.g., a fuel dispenser) may not be protecting that data from exposure (e.g., through encryption or otherwise). The secure payment module may also provide for a capability to continue to operate and accept payment methods not requiring sensitive data input (e.g., PIN) and continue to dispense product while disabled. The secure payment module may also provide for a capability to continue to provide media, advertising messages, and other prompting to consumers while disabled. In addition, the secure payment module may also provide for a capability to continue to sell goods (beyond dispensing, for example, fuel) using payment methods that do not require sensitive data input while disabled. The secure payment module may also disable all transaction capability after a set period of time, such that a service call will be required to repair/replace the disabled keypad to restore full secure transaction functionality. Thus the secure payment module may not indefinitely operate in a low security mode indefinitely.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

Figure 1:
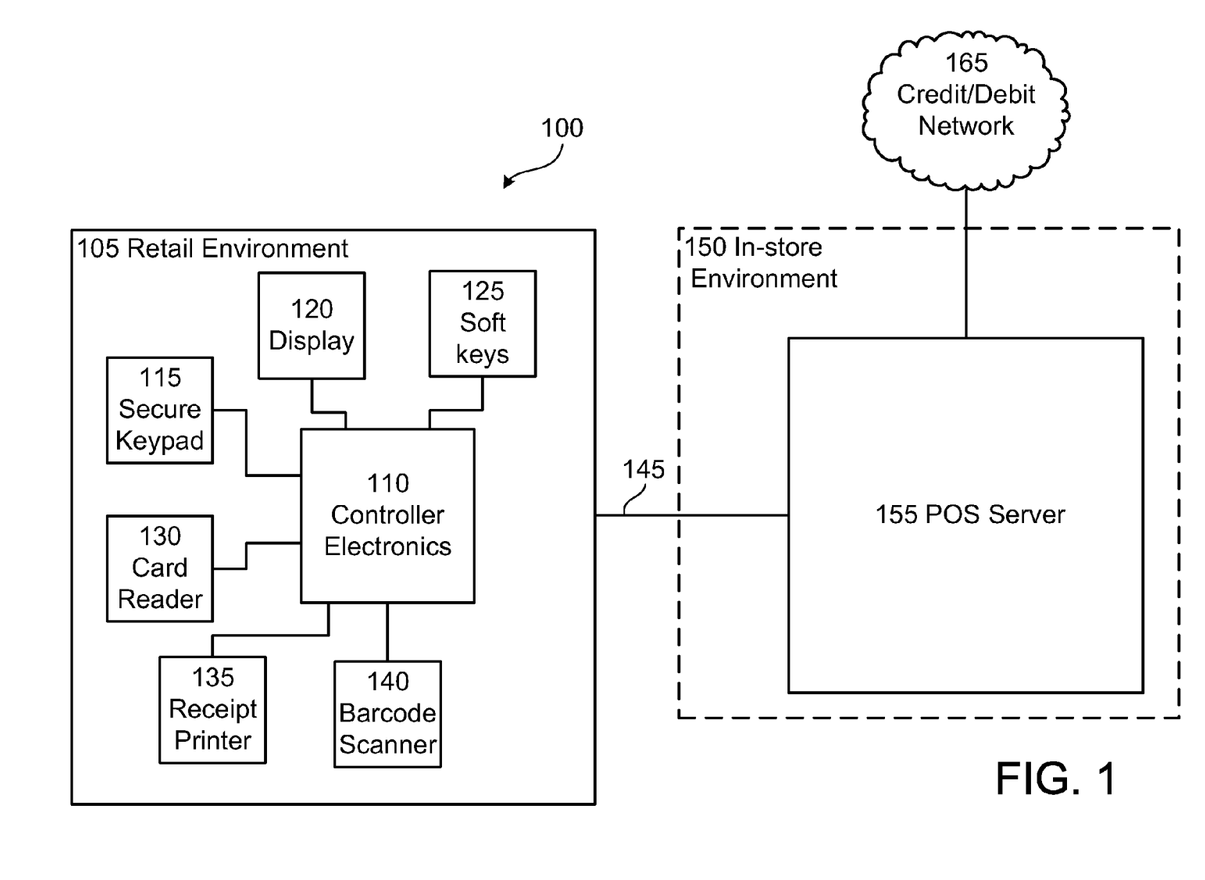
FIG. 1 is a diagram illustrating one example embodiment of a system architecture for a retail fueling environment.

FIG. 1 illustrates one embodiment of a system architecture for a retail environment 105. System 100 includes the retail environment 105, an in-store environment 150, an in-store point-of-sale (POS) server 155, a communication connection 145 between the retail environment 105 and the in-store POS server 155, and a credit/debit network 165. The system 100 may be implemented as a fueling environment, an automated teller machine (ATM), or other unattended payment terminals such as a kiosk or vending machine needing to accept both personal identification numbers (PIN) and non-PIN data entry. In the illustrated embodiment, the retail environment 105 is comprised of a plurality of modules, including a secure keypad 115, a display 120, a set of soft keys 125, a card reader 130, a receipt printer 135, a barcode scanner 140, and a set of controller electronics 110 that controls each of the aforementioned modules. Further, each module listed above may be a distinct physical entity such that independent exchange and replacement of each module is possible without requiring the exchange or replacement of the entire retail environment 105. In the illustrated embodiment, the POS server 155 acts as the master controller to the entire system, while the controller electronics 110 act as a slave to the POS server 155. In other embodiments, the controller electronics 110 may be able to perform some or all of the tasks of the retail environment 105 independently of the POS server 155. In some embodiments, a plurality of retail environments 105 may exist such that multiple customers may interact with the system 100 at a given time. One example of a plurality of retail environments 105 is a fueling environment's frontcourt, wherein multiple fuel dispensers provide a plurality of drivers with the ability to refuel and pay at the fueling dispenser simultaneously.

In more advanced retail environments 105, the controller electronics 110 may enable and control a VGA screen for playing full-motion video, communicate directly with fueling hydraulics, manage a touch screen, and perform biometric processing, among other actions. Importantly, an advanced set of controller electronics 110 may provide the retail environment 105 with the ability to present multimedia such as advertising or entertainment, as well as other rich-content for customers' consumption. In some embodiments that include an advanced set of controller electronics 110, the operator of the retail system 100, or authorized third parties, may provide customers with the option to purchase additional goods or services through additional interaction with the retail environment 105.

The modules of the retail environment 105 are common to systems accepting both secure (e.g., PIN data) and non-secure (e.g. zip code) customer information. The retail environment 105 includes a secure keypad 115 for entering the customer information into the system in response to appropriate prompts. Depending on the prompt received from the controller electronics 110, the secure keypad 115 may accept information provided by the customer to the controller electronics 110 as cipher text for sensitive information, or as clear-text for non-sensitive information. A display 120 is also present in the retail environment 105. In the illustrated embodiment, the display 120 is under the control of the controller electronics 110. To ensure that the prompts shown on the display 120 match the type of entry at the secure keypad 115, the controller electronics 110 can control both modules concurrently. If the prompt provided to the display 120 from the controller electronics 110 requires input of the confidential customer information, the secure keypad 115 ensures that data is encrypted and provided to the controller electronics 110 so that any unauthorized party attempting to intercept the data will find it difficult to determine the actual value of the customer information provided. In addition to the secure keypad 115 and display 120, the retail environment 105 includes soft keys 125 that may be programmed to cooperate with a menu presented on the display 120 to facilitate additional interaction with the customer, a card reader 130 for reading debit, credit, or smart cards used by customers to pay for the goods and services purchased, a receipt printer 135 for printing receipts memorializing the processed transactions, and a barcode scanner 140 for reading barcode-based information from items such as loyalty cards, coupons, or gift cards.

The in-store environment 150 includes the POS server 155. In the fueling environment, the POS server 155 authorizes customer transactions, such as fueling, car washes, or other merchant transactions within the store. One or more POS terminals (not pictured) may be available within the in-store environment 150 for use by operators to conduct retail transactions. These POS terminals are served by the POS server 155. The POS server 155, as described above, is the main controller (or computer) that controls and coordinates the activities of the POS system. In some embodiments, more than one POS server 155 may be present within the in-store environment 150.

In the embodiment of FIG. 1, information is exchanged between the retail environment 105 and the POS server 155 via the communication line 145 (e.g., an RS-485 serial communication line or any other suitable method of communication line). Due to the security benefits inherent in hard-line communications, a physical connection between the two locations provides the most security and is the preferred method of communication. However, some embodiments may use a wireless communication link to transfer data between the retail 105 and in-store environments 150.

The in-store environment 150, and specifically the POS server 155, is communicably coupled to a credit/debit network 165 to allow authentication of customers' payment information with the appropriate authority, such as the Visa or MasterCard networks. Standard methods of communication with those networks may be used to process the customer transactions at the retail environment 105 or at one of the POS terminals. Suitable methods of communication include Ethernet, dial-up connections, and satellite communication, among others.

Figure 2:
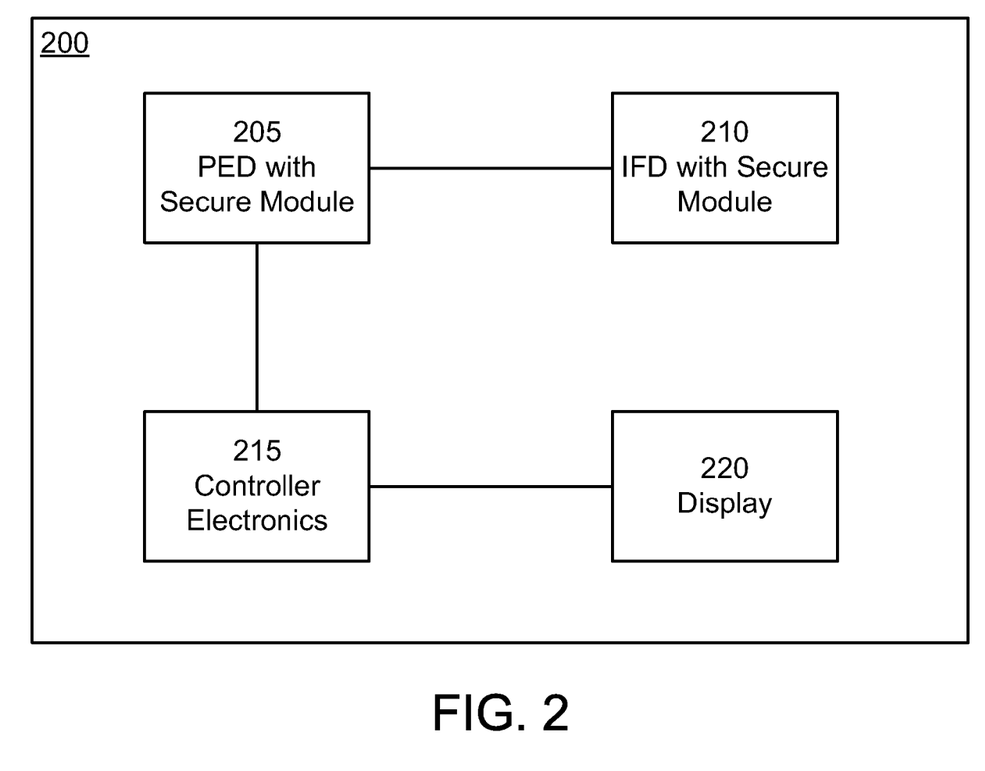
FIG. 2 illustrates a high-level diagram of an example embodiment for providing a significant level of security without sacrificing functionality for the illustrated embodiment of FIG. 1.

Referring now to FIG. 2, there is illustrated a high-level block diagram of a proposed retail environment 200 employing a modular POS terminal configuration designed to satisfy security requirements proposed by certain regulatory and industry agencies. In this configuration, the PED 205, the interface device (IFD) 210, the display 220, and the controller electronics 215 are physically separate units. Similar to the system of FIG. 1, the controller electronics 215 control the PED 205, the IFD 210, and the display 220, providing the functionality each requires and coordinating the interaction between the components.

The PED 205, which includes a secure keypad, contains a secure module operable to encrypt the confidential information (e.g., PIN values in the illustrated embodiment) received from customers before the information is transmitted to the IFD 210. The IFD 210 includes a secure module in order to decipher the information received from the PED 205. The IFD 210 may include a card reader capable of retrieving information from an integrated circuit card (ICC), a standard debit card, and/or a standard credit card (or other card with a magnetic stripe). If the card being read is an ICC, the IFD 210 may be able to read both the integrated circuit (IC) embedded in the ICC and the magnetic stripe of the card. If the IFD 210 is unable to read and retrieve magnetic stripe data from cards, a separate magnetic stripe reader may be added to the system to ensure that standard methods of payment are accepted. As stated above, the display 220 is controlled by the controller electronics 215 and presents prompts and various types of multimedia to customers during their interaction with the system. In this design, the display used for the PED 205 can be the same display as the user interface of the retail environment 200, thereby decreasing the number of displays necessary from two to one. However, in the illustrated embodiment, the PED 205 is not directly connected to the display 220. Instead, the PED 205 interfaces with the controller electronics 215, which in turn directly connect to the display 220.

Figure 3:
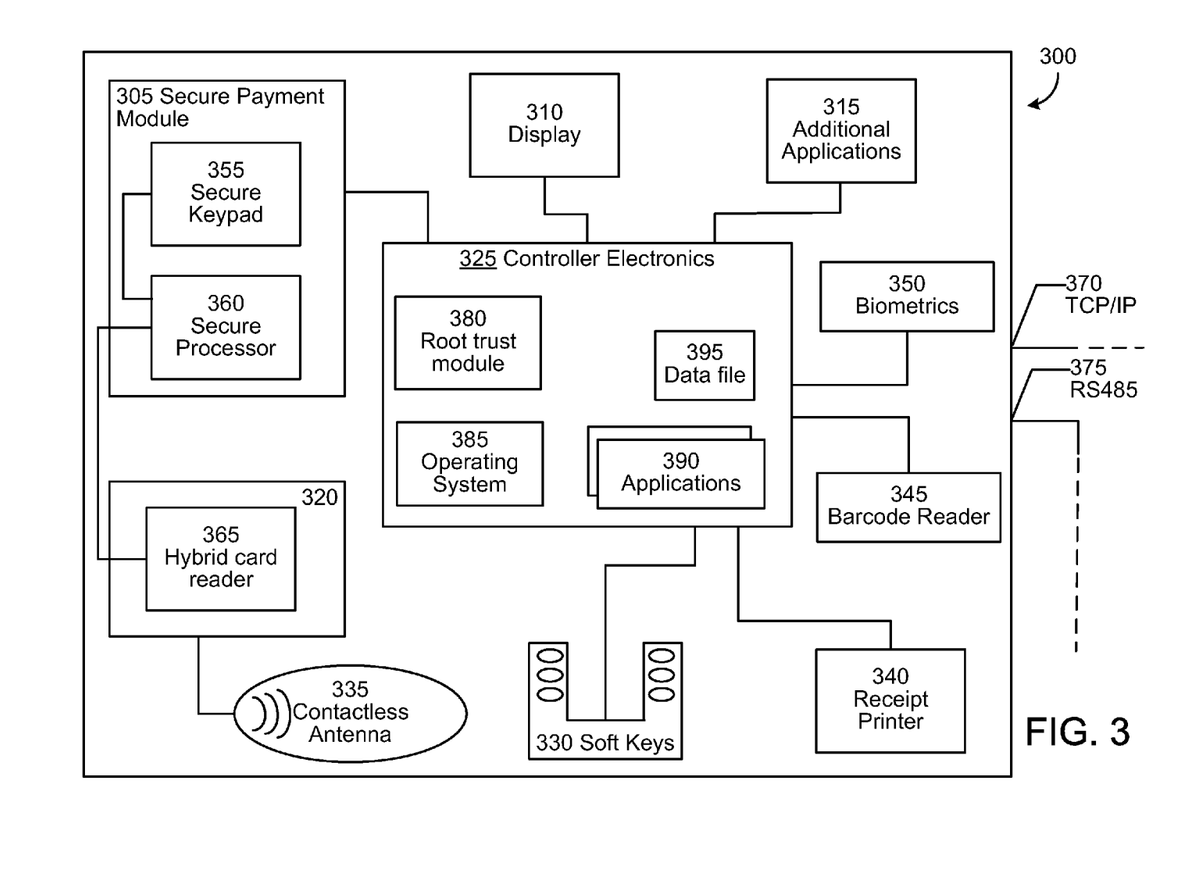
FIG. 3 is a detailed block diagram illustrating an expanded system architecture for the illustrated embodiment of FIG. 1.

FIG. 3 provides a detailed block diagram illustrating an expanded system architecture of the exemplary embodiment of FIG. 1. System 300 focuses primarily upon the architecture of the retail environment 300, illustrating an embodiment providing enhanced physical security in addition to an improved level of communications security. The retail environment 300 includes a secure keypad 355 and a secure processor 360 housed within a secure payment module 305, which is a tamper-resistant and tamper-responsive enclosure used to protect the encryption keys and the electronics from tampering. The combination of the secure keypad 355 and the secure processor 360 is similar to the PED 205 described in FIG. 2. The hybrid card reader 365, capable of reading ICCs, debit cards, and credit cards, is also enclosed within a tamper-resistant and tamper-responsive enclosure 320. By protecting these critical input devices, the physical security of the retail environment 300 is enhanced.

In this embodiment, the secure processor 360 and the hybrid card reader 365 are communicably connected through a communication line. In some embodiments, the connection may be an RS-232 serial connection using RJ-45 plugs and jacks. In still other embodiments, the secure processor 360 and the hybrid card reader 365 may be co-located in a single module. For instance, the hybrid card reader 365 may be physically located within the secure payment module 305 to create an even more secure environment. The hybrid card reader 365 may act as a slave to the secure processor 360, providing it with data received from customer cards. While the connection between the card reader 365 and the processor 360 may not be physically secured, sensitive data from the card reader 365 may be encrypted prior to transmission to the secure processor 360. The secure processor 360 and the card reader 365 may authenticate each other prior to exchanging information, such as by performing a two-way challenge authentication procedure. Once trust is established, any sensitive data (e.g., magnetic card data, PINs for smart card transactions, or other sensitive data) from the card reader 365 will be sent to processor 360 in encrypted format.

Other modules included within the retail environment 300 are similar to those described in FIGS. 1 and 2. Additional modules may include a contactless antenna 335 for use with radio frequency identification (RFID) tags or other wireless information exchange techniques. A biometric module 350 may also be included for payment or identification via biometric means, such as fingerprint reading or iris scanning. A miscellaneous module 315 providing additional retail environment 300 features may be included as well. An example of possible additional features may be the iX® Platform Features created by Dresser-Wayne, Inc. for use in fueling environments. A set of soft keys 330 may be programmed to supplement the display 120 to allow additional methods of interaction with the retail environment, and a receipt printer 340 may also be provided for printing receipts. Finally, a barcode reader 345 may be present to allow for the reading of barcode-based items such as loyalty cards, coupons, or gift cards. All modules within the retail environment 300 are housed in a secure location, such as a fuel dispenser cabinet or ATM housing, which is locked and inaccessible from the outside, except for maintenance purposes.

Extending from the illustrated embodiment's retail environment 300 are two communication lines, a TCP/IP connection 370 and an RS-485 serial connection 375. The RS-485 serial connection 375 may be used to communicate with the POS server 155 and the in-store environment 150. The TCP/IP connection 370 may be used to provide more dynamic data to the retail environment 300 for which additional bandwidth is necessary, such as multimedia advertising, detailed graphical displays, and similar types of data. Data sent with the TCP/IP connection 370 may be provided by the retailer and the POS server 155 or a third-party content provider. Other connections may interface with the retail environment 300 for additional communication lines required or desired by a specific embodiment.

To further secure the retail environment 300, a variety of cryptographic techniques may be used, including public key/private key encryption. Public key/private key encryption provides the ability to encrypt data using a public key which can only then be decrypted by a receiving party or component possessing a private key associated with the public key. A popular public key/private key encryption algorithm is the RSA public-key cryptography system developed by Ronald L. Rivest, Adi Shamir, and Leonard M. Adleman in 1977. The challenge of public-key cryptography is developing a system in which it is extremely difficult to determine the private key. This is accomplished through the use of a one-way function. By using a one-way function it is relatively easy to compute a result given some initial input values. However, it is extremely difficult to determine the original values starting with the result. In mathematical terms, given a value x, computing f(x) is relatively easy. However, given the result f(x), computing x is very difficult. The one-way function used in the RSA algorithm is a multiplication of prime numbers. It is mathematically simple to multiply two large prime numbers, however it is extremely time-consuming to factor them for most very large primes. Public-key cryptography makes use of this property of large prime numbers by implementing a system that uses two large primes to build a private key, and the product of the primes to build a public key. A simplified example of the RSA algorithm is described as follows:

Key Generation

By selecting two primes, P=11 and Q=23, the RSA algorithm is used to generate the numbers N, E, and D in the following manner:

$$N=P\times Q=11\times 23=253$$

$$PHI=(P-1)(Q-1)=220$$

The public exponent E is calculated so that the greater common divisor of E and PHI is 1. In other words, E is relatively prime with PHI. For this example:

$$E=3$$

In the RSA algorithm, N and E are used as the public keys. The private key D is the inverse of E modulo PHI. By using an extended Euclidian algorithm, the example private key is determined as D=147.

Encryption

To encrypt data, for example a number M=4, the following procedure is used to form an encrypted message C:

$$C=M^E \bmod N=4^3 \bmod 253=64$$

Thus, the example encrypted message is 64.

Decryption

The encrypted message will be decrypted to form a decrypted message M from the encrypted message C using the following procedure:

$$M=C^D \bmod N=64^{147} \bmod 253=4$$

thereby recovering the original message data. Although the above example used small prime numbers for illustrative purposes, in actual practice the prime numbers selected for public key/private key cryptography are very large numbers. In the illustrated embodiment, 2048 bit RSA-cryptography is used. Other known methods, such as the Diffie-Hellman algorithm (DH) or the Data Encryption Standard (DES), may be used as the method of cryptography in alternative embodiments.

Additionally, digital signatures may be used to authenticate modules and components in the retail environment 300. A digital signature is a cryptographic means through which the identity of an originating party may be verified. Typically, the digital signature is created through the use of a hash function and encryption using the sending party or component's private key, although other methods may be used. In the illustrated embodiment, a hash function may be applied to a message or set of data (shown as HASH(data)) such that a message digest is generated. The message digest allows a message or set of data of an arbitrary length to be reduced to a fixed length. After generating the message digest using the hash function, the message digest may then be encrypted by the sending party (or component) prior to delivering the message and the message digest. Upon receipt at the receiving party (or component), the digital signature may be authenticated by decrypting both the message and message digest, applying an identical hash function to the message, and comparing the decrypted message digest sent from the originating party with the message digest created at the receiver's end. If the message digests are identical, the digital signature is considered authenticated. If the two do not match, either a third party or outside component is attempting to impersonate the originating party or component, or the message itself has been altered since the originating party initially calculated the message digest. In either case, a possible security breach has occurred and suitable actions should be taken. In the illustrated embodiment, the hash algorithm applied may be a SHA1 one-way hash resulting in a 160-bit message digest. In alternative embodiments, a stronger hash algorithm, such as SHA256, may also be used if desired.

The retail environment 300 and its modules may contain a number of public and private keys and digital signatures. Each embodiment may have a different set of keys and/or signatures according to the actual requirements of that system. The following chart provides a list of the pertinent keys within the illustrated embodiment of FIG. 3. This list is not meant to be exhaustive, and includes only those keys pertinent to the illustrated embodiment. In this example, all public keys other than the root certificate authority key are stored in minimal certificate form with a digital signature or chain of signatures that can ultimately be traced to the root. Additionally, each certificate may contain the key type and/or meta information such that key misuse is limited and/or eliminated, allowing each key to be used for only a single purpose.

TABLE 1

Pertinent Cryptographic Keys for FIG. 3

| Name | Description |
| --- | --- |
| RootCApub | Public key of root CA - used to verify certificates. Self-signed. |
| RootCApriv | Matching private key, used to sign certificates for other keys. The most critical key to keep secure |
| SPMToCEpub | Used by controller electronics to verify responses from SPM |
| SPMToCEpriv | Used to sign SPM responses to controller electronics |
| CEOSAuthpub | Used by controller electronics' root trust module to verify controller electronics OS image |
| CEOSAuthpriv | Used to sign valid controller electronics OS images |
| CEAppAuthpub | Used by controller electronics OS to verify controller electronics application code |
| CEAppAuthpriv | Used to sign valid controller electronics application binaries |
| CEPromptAuthpub | Used by controller electronics application to validate file containing all numbered prompts May be used to authenticate a sub-prompt certificate |
| CEPromptAuthpriv | Used to sign file containing prompts May be used to sign a customer prompt certificate. |
| CEBAAuthpub | Used with controller electronics root trust module to validate it to SPM |
| CEBAAuthpriv | Signs valid controller electronics root trust module |

Returning to FIG. 3, the controller electronics 325 include three software components used in the operation of the retail environment 300: a secure root trust module 380, an operating system 385, and a set of applications 390. The root trust module 380 of FIG. 3 is a software program or secure chip whose functionality allows the operating system 385 to be authenticated upon initialization and startup of the retail environment 300. The secure root trust module 380 may be implemented as a flash memory integrated circuit soldered to the controller electronics 325. In some instances, the secure root trust module 380 may instead be embodied by a secure chip capable of authenticating various portions of the controller electronics 325, including the controller electronics 325 itself, in addition to providing identification information that allows other components to authenticate the controller electronics 325. The root trust module 380 may also be implemented in other non-volatile memory that interfaces the controller electronics 325 such as read-only memory (ROM), programmable read-only memory (PROM), mask-programmed ROM (MPROM), battery-backed static random access memory (RAM), or a secure digital (SD) card, among others.

In the illustrated embodiment, the operating system 385 of the controller electronics 325 may be Microsoft Windows CE, Red Hat (or another version of) Linux, Unix, or another suitable operating system. The operating system 385 may be stored on a Secure Digital (SD) card, embedded into onboard flash memory, or stored in any other suitable location. The operating system 385 is responsible for device drivers, network interfaces, system libraries, and for launching any applications 390 for use in the retail environment 300. The applications 390 loaded by the operating system 385 may also be stored on a Secure Digital (SD) card, embedded into the onboard flash memory of the retail environment 300, or stored in any other suitable location. The applications 390 may collectively control all aspects of the display 310 and the retail environment interface (i.e., the secure keypad 355, the secure processor 360, and the hybrid card reader 365), as well as the communications of the controller electronics 325 to other modules and devices.

In this embodiment, the display 310 is not required to be physically secure. Due to the logical security implemented between the controller electronics 325 and the display 310, and the fact that the display 310 is not directly connected to the secure processor 360, the current system is protected from attempts by unauthorized agents to intercept or alter the data meant for presentation on the display 310. Secure information regarding customers' PIN numbers or magnetic card data is not provided to the display 310 from the controller electronics 325. Instead, that information is sent via the secure communications link between the controller electronics 325 and the secure payment module 305. Additionally, information transmitted between the secure payment module 305 and the controller electronics 325 is encrypted such that outside agents attempting to intercept the data would find understanding the information extremely difficult and time-consuming. Because the display 310 is not physically secured to the retail environment 300, exchanging the display 310 with a new model becomes a simple and inexpensive task, saving operators time and costs. Additionally, the display 310 does not need to include a secure chip, nor will the retail environment 300 require a redesign to enhance its security.

In order to add a level of security to software stored in the controller electronics 325, some embodiments may allow only cryptographically-authenticated software to be run. In effect, a trust model may be developed to ensure that all software present in the retail environment 300 is authentic. In the illustrated embodiment, the trust model may rely upon digital signatures to authenticate the software. If software attempts to load that does not have a digital signature, or the digital signature it does have is not recognized, the software will not be allowed to run. In order to ensure a secure system, the digital signing of all software may be performed in a secure environment. In one embodiment, the secure environment may employ a process of dual control (split knowledge) when performing cryptographic functions. Additionally, appropriate review procedures should be followed prior to cryptographically signing the software.

With regards to the trust model, cryptographic components may be embedded within the secure root trust module 380, such that the root trust module 380 may cryptographically authenticate the operating systems 385. Additionally, cryptographic data allowing other components to authenticate the secure root trust module 380 may also be embedded therein. The following components, among others, may be embedded within the root trust module 380 in some embodiments:

1. RootCApub certificate;
2. CEOSAuthpub certificate;
3. CEBAAuthpub certificate; and
4. $E_{CEBAAuthpriv}$(HASH(root trust module contents)).

Referring to Table 1 above, the RootCApub certificate may represent the public key of the root certificate authority and may be used to verify other certificates. In other embodiments, the RootCAPub certificate may not be embedded within the secure root trust module 380. In those instances, other digital signatures may be used to chain validate the origin and authenticity of the root trust module 380. Next, the CEOSAuthpub certificate may be used to verify the operating system image 385 being loaded. In some instances, the CEOSAuthpub certificate may not be embedded within the root trust module 380. Instead, the certificate may be contained in the operating system binary code may be authenticated using the RootCApub certificate to establish trust. This CEOSAuthopub certificate may then be used to authenticate the operating system image. The CEBAAuthpub certificate may be used by the secure modules to validate the root trust module 380. The final component listed, $E_{CEBAAuthpriv}$(HASH(root trust module contents)), represents the digital signature of the secure root trust module 380 as encrypted with the CEBAAuthpriv certificate. The root trust module contents are hashed by a specific hash algorithm to generate a unique digital fingerprint. After hashing the contents, the fingerprint is encrypted using the CEBAAuthpriv certificate, the private key associated with the root trust module 380. A component attempting to authenticate the root trust module may use the root trust module's public key, CEBAAuthpub, to decrypt the value. Using the identical hash algorithm, HASH(root trust module contents) may be calculated. If, after comparing the decrypted hash value and the calculated hash value, the values are identical, the root trust module 380 may be considered authenticated.

Operating systems 385 loaded onto the controller electronics 325 may need to be digitally signed before allowed to run. The digital signature may be stamped on the operating system binary, and may be computed with $E_{CEOSAuthpriv}$(HASH(OS contents)). Using the embedded cryptographic components, the root trust module 380 may authenticate these operating systems by extracting the operating system's digital signature and comparing it to the calculated hash value. The hash value of the operating system may be decrypted using the root trust module's 380 embedded public key value, CEOSAuthpub. Once decrypted, HASH(OS Contents) may be compared to the calculated hash value of the operating system contents. If the values are identical, then the operating system is authenticated and may be booted. If the values do not match, the operating system is not booted and in some embodiments, an error is reported.

Just as the root trust module 380 verifies the authenticity of the operating system 385 before it allows the operating system to start, the operating system 385 must verify the authenticity of the applications 390 that are contained outside the operating system 385 image. Before an application 390 can execute, the operating system 385 may call a special loader function to determine whether the module is allowed to load. At that time, the operating system 385 can generate the value of HASH(Application Contents). This value can then be compared to the $D_{CEAppAuthpub}$(Application digital signature), the value of the Application digital signature decrypted by the public key CEAppAuthpub. If the values match, then the application 390 will be allowed to load. If they do not match, the operating system 385 will not load that application 390. Each application 390 that is to be run on the controller electronics 325 and is not embedded into the operating system 385 image must be digitally signed before being allowed to run. The digital signature may be stamped onto the Application binary, and may be computed with $E_{CEAppAuthpriv}$(HASH(Application Contents)).

Finally, authorized applications 390 may be responsible for verifying the authenticity of a package of on-screen prompts to be sent to display 310 for viewing by the customer. Screen displays, information requests, and/or other content that will be provided to the display 310 and in some instances, values showing whether any requested keypad entry should be in secure or non-secure mode, may be stored within a data file 395. The data file 395 may be stored on a Secure Digital (SD) card, flash memory, or other suitable forms of volatile or non-volatile memory that may be coupled to the controller electronics 325. In some embodiments, the data files 395 may be an XML file, a simple text file, or any other file format compatible with the operating system 380 and the applications 390 accessing the file 395. Data prompts within the data file 395 may be textual, graphical, or consist of binary blobs describing how the prompt is to operate, in addition to other suitable formats. In some embodiments, the data file 395 can be digitally signed with the signature $E_{CEPromptAuthpriv}$(HASH ((prompt file)). When the application 390 requests that the secure payment module 305 perform confidential or non-confidential data entry, the application 390 may verify the digital signature of the data file 395 before displaying the prompts on the display 310 and enabling the secure keypad 355 to allow data entry. The verification process may be performed by comparing the value of HASH(prompt file) to $D_{CEPromptAuthpub}$(prompt file digital signature). If the values match, the prompt file may be authenticated and the prompts provided to the display. If the values do not match, the prompts may not be displayed and appropriate security notifications should be made to check for potential unauthorized access. In other instances, if the values do not match, the prompt may still be presented at the display 310, although the secure keypad 355 may be disabled to avoid entry of confidential data while the secure payment module 305 is in a non-secure state. Alternatively, a customer prompt key pair may be substituted for the CEPromptAuth key pair. In this embodiment, the customer prompt public key must be signed by CEPromptAuthpriv to generate the prompt certificate. Before the certificate is issued, the customer's security procedures must be reviewed to ensure that the certificate will be kept secure after issuance. Thus, for the secure keypad 355 to be enabled, the prompt file must be digitally signed and authenticated.

Having performed the authentication of the software on the controller electronics 325, the components of the secure payment module 305 and the controller electronics 325 must validate each other as legitimate and trusted devices before full operation of the retail environment commences. First, the controller electronics 325 must validate the secure keypad 355 and secure processor 360 within secure payment module 305 (collectively referred to as "SPM 305") before the controller electronics' software completes its startup sequence. In some embodiments, validation of the SPM's 305 identity may take place implicitly by the establishment of a session key with the SPM 305. By verifying that the SPM 305 can establish a link with session-level encryption, the SPM 305 may verify that it can sign a challenge from the controller electronics 325 with SPMToCEpub. Because the SPM certificate for SPMToCEpub is authenticated by the root certificate authority, it may be considered a legitimate module. A further description of establishing a secure communications channel/link between the SPM 305 and the controller electronics 325 is discussed with relation to FIG. 4.

Continuing the mutual authentication, the SPM 305 must validate the controller electronics 325 before the secure keypad 355 may be controlled by the controller electronics 325. To validate the controller electronics 325, the initial handshake with the SPM 305 from the controller electronics 325 may include sending a copy of the root trust module 380. The SPM 305 can determine the hash value for the root trust module 380 after the module is received. The SPM 305 can also extract the digital signature of the root trust module 380. The SPM 305 may also extract the CEBAAuthpub certificate from the secure root trust module 380. First, the CEBAAuthpub certificate may be validated with a copy of RootCApub stored within the SPM 305. In other embodiments, the CEBAAuthpub certificate may be chain validated using other certificates signed by the root certificate authority. If the CEBAAuthpub certificate is cryptographically authenticated, the CEBAAuthpub certificate may be used to verify the digital signature of the root trust module 380. If the computed hash of the root trust module 380 matches $D_{CEBAAuthpub}$(Root trust module Digital Signature), then the root trust module 380 may be considered cryptographically authenticated. After authentication, further commands may be sent to the SPM 305. In some alternative embodiments, the controller electronics 325 may include a secure chip or processor that can perform a two-way authentication with the SPM 305. In those embodiments, the secure chip or processor may perform the authentication techniques necessary to create the secure communications link between the controller electronics 325 and the SPM 305.

Figure 4:
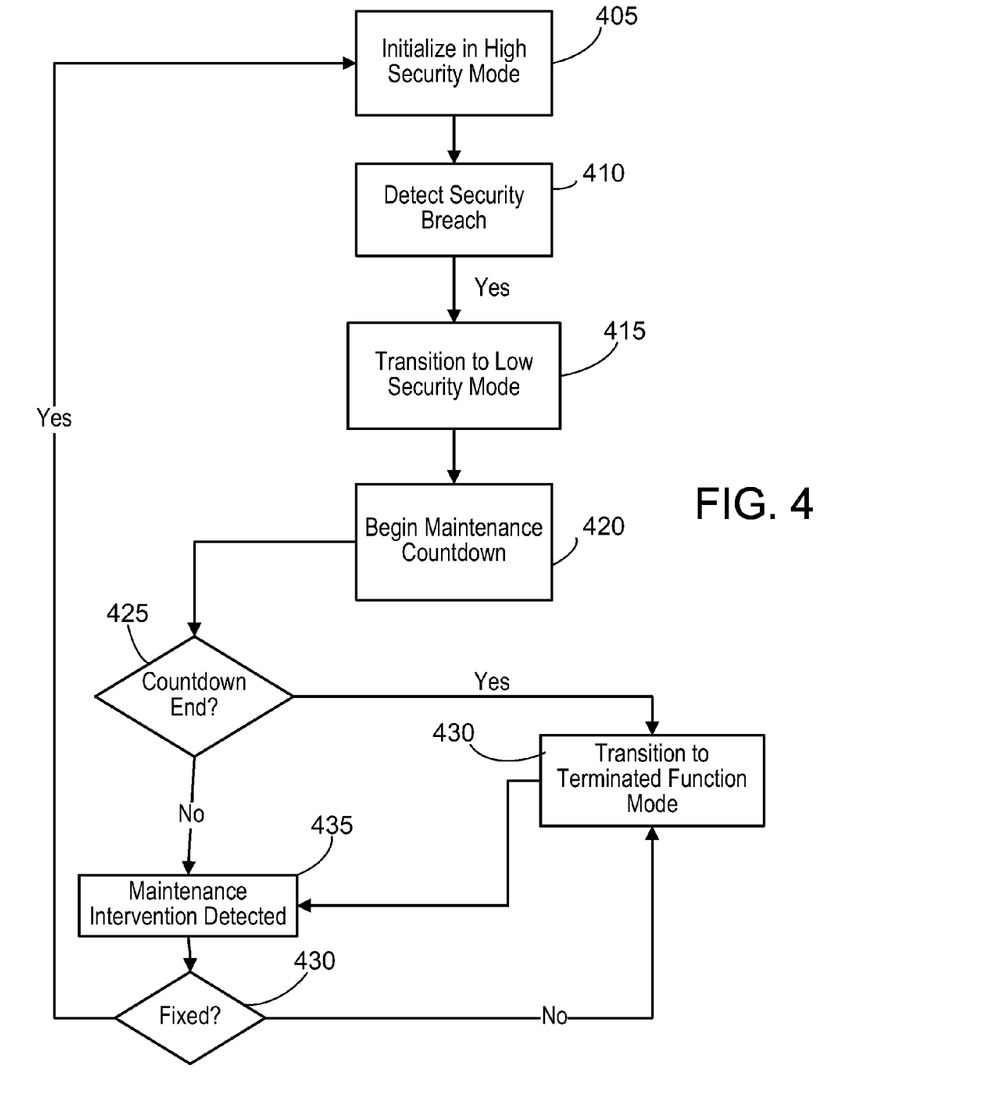
FIG. 4 is a flowchart diagram illustrating an example process executed by one embodiment of the retail environment elements of FIG. 1.

FIG. 4 is a flowchart diagram illustrating an example process executed by the retail environment 105 elements of FIG. 1. The design of retail environment 105 provides multiple security modes of operation appropriate for use depending on the security conditions of the retail environment 105. For clarity, FIG. 4 is described for a retail environment 105 with one module. For retail environments with more than one terminal module, FIG. 4 applies to a single module.

The retail environment 105 is initialized for operation in a high security mode at 405. For example, the high security mode can be the default mode of the retail environment 105 which is entered into upon normal boot or power on sequence. The high security mode can enable all functionality desired for the retail environment 105, including accepting both sensitive information (e.g., PIN information) and non-sensitive information (e.g., zip code or phone number information) from a customer through the secure keypad 115. The sensitive information can be enciphered by the secure keypad 115 and provided to the controller electronics 110 as cipher text, and non-sensitive information can be provided by the secure keypad 115 to the controller electronics 110 as clear-text. For example, a customer debit transaction can require the customer to enter a PIN, which is sensitive information, through the secure keypad 115. An example credit card transaction can require another customer to enter ZIP code information, which is non-sensitive information, through the secure keypad 115.

The retail environment 105 detects a security breach event at 410. For example, a motion detector in the secure keypad 115 or retail environment 105 can detect a motion event indicating unauthorized access, or the state of the retail environment software can be compromised in such a way as to reduce assurance of proper handling of sensitive information. In some cases, the security breach may be due to an error in software, firmware, or hardware, rather than a purposeful breach for obtaining confidential or secure information.

In response to the security breach event, the retail environment 105 transitions to a low security mode at 415. In one example, the secure keypad 115 may be disabled to accept secure information such as a debit transaction PIN, or the retail environment 105 can be disabled to initiate a transaction that requires secure information. In another example, the retail environment can halt all retail environment 105 transactions and instruct customers to pay in the in-store environment 150. The retail environment 105 can continue operations that require no information, such as dispensing a product paid for at a POS terminal, and/or can continue operations that require non-secure information but no secure information, such as a credit card transaction. The idle contents of the display 120 can be altered to alert customers that some or all functionality is unavailable. For example, a message describing the limited functionality and the default idle contents can be alternated on the display 120.

The retail environment 105 begins a maintenance countdown at 420. During the maintenance countdown, the retail environment 105 can operate in the low security mode and send one or more notifications to the POS terminal 115 or other components. The alert is a notification that the retail environment 105 is operating in a low security mode, and can include the time left in the maintenance countdown. The maintenance countdown can be configured to permit use of the retail environment 105 for a limited time while maintenance is requested, but limited to such a length as to prevent long term usage of the retail environment 105 in a low security mode.

If the end of the maintenance countdown is reached without any maintenance intervention, the retail environment 105 transitions at 430 to a terminated functionality mode at 425. For example, some or all functionality available in the low security mode is terminated until the retail environment 105 receives a maintenance intervention. For an example low security mode that permits credit card transactions and product dispensing, credit card transaction functionality can be terminated, but product dispensing functionality can be continued for transactions completed at a POS terminal. For an example low security mode that permits only product dispensing, all functionality of the retail environment 105 can be terminated. In other embodiments, once the maintenance countdown is reached without any maintenance intervention and the retail environment 105 transitions at 430 to a terminated functionality mode at 425, all functionality at the retail environment 105 is terminated.

For instance, the retail environment 105 may display a message indicating that there has been a system failure and service and/or maintenance should be contacted.

A maintenance intervention event can be detected by the retail environment 105 at 435. For example maintenance personnel can enter a passcode through the secure keypad 115, input a maintenance card in the card reader 130, or unlock a maintenance door in the retail environment 105. Additionally, the maintenance personnel can diagnose, reset and/or repair the retail environment 105 as appropriate. If the maintenance personnel is able to successfully repair 430 the retail environment 105, the retail environment 105 resumes operation in the high security mode at 405.

If the maintenance personnel is unable to successfully repair the retail environment 105, the retail environment 105 resumes operation in the low security mode and an additional maintenance countdown can be started at 430. The number and length of additional maintenance countdowns can vary, and can be pre-determined or set by maintenance personnel or the operator of the retail environment 105. For example, the countdown may be set to 14 days, 10 days, or other periods of time which may be longer or shorter.

Two example low security modes were briefly described above, and will be further described here. These low security modes are labeled 1 and 2 for clarity, but are not intended to suggest an order or ranking. Other low security modes are possible.

Low security mode 1 is designed to prevent any data entry by a customer through the secure keypad 115. This low security mode may be appropriate for use in meeting the requirement of standards that require terminating all function of a compromised PIN data entry device, such as the Europay, MasterCard, Visa (EMV) standard or the Unattended Payment Terminal (UPT) standard. When a security breach event is detected, the controller electronics 110 informs the POS server 155 via an XML message and displays a generic message on the display 120 to indicate that transactions at the retail environment 105 are disabled and the customer may pay at a POS terminal in the in-store environment 150. Additionally, the display 120 can show non-secure prompts to a customer, such as pre-fueling messages, fueling messages and post fueling messages in the case of a gas pump. Some or all of the elements of the retail environment 105 are disabled, such as the secure keypad 115 and the card reader 130. The SPM 305 will not initiate a secure action while in the example low security mode 1.

The following elements of the retail environment 105 may be workable in low security mode 1:
  Barcode Scanner 140
  Receipt Printer 135
  Soft Keys 125
  Display 120

In some examples, the SPM 305 is responsible for detecting some or all security breach events and reporting them to the controller electronics 110. At boot, the controller electronics 110 can output through display 120 a message such as "Terminal Security Breach—Call for Service" or similar message until such time as the controller electronics 110 updates the screen for the non-secure prompts described above. The controller electronics 110 allows "pay inside" type transactions where a customer pays at a POS terminal in the in-store environment 150 for a product to be dispensed in the retail environment 105. Functionality for MACing, authentication, and encryption may not be supported in the example low security mode 1.

One or more events can be registered with the POS server 155, such as when successfully entering the low security mode 1 or a failed attempt to enter the low security mode 1.

Low security mode 2 may be designed to prevent secure information from being input to the retail environment 105 while still permitting non-secure information being input. For example, information which must be enciphered, such as PINs, is prevented from input, but information which may be communicated in clear-text, such as telephone numbers and ZIP codes, is permitted. This low security mode may be appropriate for use in meeting the requirement of standards that require terminating only secure information functions of a compromised PIN data entry device, such as the Encrypting PIN Pad (EPP) standard. Transactions requiring only clear-text, such as fleet card usage, credit card transactions, or customer loyalty card entry may still be possible in low security mode 2.

When a security breach event is detected, the controller electronics 110 informs the POS server 155 via an XML message and displays a message on the display 120 to indicate that some (e.g., PIN/debit) transactions at the retail environment 105 are disabled and the customer may pay with some transaction types in the retail environment 105, or with any transaction type at a POS terminal in the in-store environment 150. The SPM 305 may not initiate a secure action while in the example low security mode 2.

The following elements of the retail environment 105 may be workable in low security mode 2:
  Card Reader 130
  Barcode Scanner 140
  Receipt Printer 135
  Soft Keys 125
  Secure Keypad 115—Both function keys and non-encrypted data entry, such as ZIP code or phone number.

The SPM 305 may operate according to the following rules in low security mode 2:
  Once the SPM 305 is breached, the SPM 305 may report that status to the controller electronics 110.
  The SPM 305 may require a command to enable low security mode 2. This may turn off authentication and encryption capabilities for the secure keypad 115 and associated interfaces and fall back on plain-text communication.
  After the SPM 305 is breached, the SPM 305 may track whether this special mode is available, and the time for which it is available.
  When powered, the SPM 305 may program a reservable area in flash details on this mode. Periodically, bits may be programmed to indicate that "xx" many hours have gone by. When the bits fill up, the SPM 305 may no longer allow entry into this low security mode.
  The SPM 305 may only allow limited functionality operation for a limited window (e.g., 14 days). Once expired, intervention may be required with the controller electronics 110 again to restart the window counter for the same or a different window.
  The secure keypad 115 and card reader 130 may continue to function, except for receiving secure information.

The controller electronics 110 may operate according to the following rules in low security mode 2:
  Messages may be displayed on the display 120 at boot, upon initial security breach, or expiration of the initial window indicating "Terminal Security Breach—Call for Service" or similar message, but will allow the soft key 125 combination for entry into limited functionality mode. This can be activated by site personnel with assistance of a help desk. Alternatively, this can be controlled remotely via the POS server 155.

Run time diagnostics may show how many days the SPM 305 has been operating in low security mode 2.

If this mode is entered, the controller 110 may try to negotiate with SPM 305 to sync into this mode. When this mode is entered, the controller electronics 110 may report a successful event to the POS server 155 and enable low security mode 2. If this mode can't be entered, the controller electronics 110 may issue a failure message to the POS server 155 and block any normal transaction. The message at this time may revert to the terminal security breach message as above to allow for "pay inside" transactions.

If this mode is entered, the controller electronics 110 may allow non-secure transaction with the card reader 130, the receipt printer 135, barcode scanner 140, a bill acceptor (not shown), the soft keys 125, the display 120 and the secure keypad 115 (only in non-encrypted mode).

The controller electronics 110 may block issuance of "enable PIN" command (return false and disable the secure keypad 115).

Exceptions to low security mode 2:

Low security mode 2 is supported with non-secure card reader 130, or with a secure card reader 130 that can function in a non-secure mode.

The retail environment 105 can store setting information to operate in low security modes 1, 2, and/or other low security modes. Upon deployment, boot up, or at other times, the retail environment can be configured to enter one of the possible low security modes upon security breach. This configuration can be set or changed by a technician at the retail location 105 using input elements such as the secure keypad 115, the card reader 130, and the soft keys 125. The low security configuration can be set by a remote technician or a technician in the in-store environment via the POS server 155. When presenting the technician with prompts for setting low security configurations, the low security modes can be labeled and organized numerically, as described here; by an associated security standard; or by geographic region (e.g., country), where each region is associated with one or more security standards in use in that region.

In some examples, the retail environment enters a selected low security mode upon detection of any security breach. In these examples, a retail environment enters the same low security mode upon detection of a device removal or tamper event for any device, a loss of state event for the controller electronics 110, and a failed authentication event between the retail environment 105 and the POS server 155.

In some other examples, the retail environment enters different low security modes depending on the type of security breach detected. For example, a retail environment 105 with a card reader 130 that accepts both secure and non-secure information as well as a secure keypad 115 that accepts both secure and non-secure information, can differentiate device removal or tamper events associated with either the secure keypad 115 or the card reader 130. Upon detection of a tamper event associated with the secure keypad 115, the retail environment can enter a low security mode that restricts secure input to the secure keypad 115, but that permits secure input to the card reader 130. Upon detection of a tamper event associated with the card reader 130, the retail environment can enter a low security mode that restricts secure input to the card reader 130, but that permits secure input to the keypad 115.

While the preceding flowchart and accompanying descriptions illustrate exemplary processes, the retail environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the retail environment may use methods with additional steps, fewer steps, and/or different steps, so long as the process remains appropriate. Thus, the above description of example embodiments does not define or constrain the disclosure. Other changes, substitutions, and alterations are possible without departing from the spirit and scope of this disclosure, and such changes, substitutions, and alterations may be included within the scope of the claims included herewith.

What is claimed is:

1. A system, comprising:
   a keypad;
   a card reader; and
   a controller configured to:
   transition the system between a high security mode, in which the card reader is enabled to read a customer payment card and in which the keypad is enabled to accept manual input of unsecure information from a customer in relation to a retail transaction and to accept manual input of secure information from the customer in relation to the retail transaction, and a low security mode of operation, in which the card reader is enabled to read a customer payment card and in which the keypad is enabled to accept the manual input of unsecure information and is disabled from accepting the manual input of the secure information,
   determine when security of the system has been breached, and
   transition the system from the high security mode to the low security mode in response to determining that the security of the system has been breached.

2. The system of claim 1, wherein the controller is configured to stop all retail transactions that use the keypad when the system is in the low security mode.

3. The system of claim 1, wherein the controller is configured to prevent the system from beginning a retail transaction that requires input of secure information via the keypad when the system is in the low security mode.

4. The system of claim 1, wherein the low security mode includes a plurality of different low security modes, and the controller is configured to select one of the plurality of different low security modes to transition to from the high security mode in response to determining that the security of the system has been compromised, the selection being based on a type of the security breach.

5. The system of claim 1, wherein the low security mode includes a plurality of different low security modes, and the controller is configured to transition to a preselected one of the plurality of low security modes from the high security mode in response to determining that the security of the system has been breached.

6. The system of claim 1, wherein the controller is also configured to transition the system from the low security mode to the high security mode in response to maintenance that addresses the breach being performed on the system.

7. The system of claim 1, wherein the controller is also configured to transition the system from the low security mode to a terminated functionality mode in response to maintenance that addresses the breach not being performed on the system within a predetermined amount of time after the transition from the high security mode to the low security mode; and in the terminated functionality mode, the keypad is disabled from accepting any information.

8. The system of claim 1, further comprising a display, the controller also being configured to:
display a first prompt on the display requesting input of the unsecure information;
display a second prompt on the display requesting input of the secure information;
cause the first prompt to be displayed on the display when the system is in the high security mode but not when the system in the low security mode; and
cause the second prompt to be displayed on the when the system is in the high security mode or in the low security mode.

9. The system of claim 1, wherein the unsecure information input to the keypad is unencrypted when transmitted to the controller, and the secure information input to the keypad is encrypted when transmitted to the controller.

10. The system of claim 1, wherein the system includes a fuel dispensing system configured to dispense fuel therefrom.

11. The system of claim 10, wherein the system in the high security mode and in the low security mode is configured to dispense the fuel therefrom.

12. The system of claim 1, wherein the system includes an automated teller machine.

13. The system of claim 1, wherein the system includes an unattended payment terminal configured to accept payment for at least one of a good and a service.

14. The system of claim 1, wherein the controller is also configured to start a count of an amount of time in response to transitioning the system from the high security mode to the low security mode, and the controller is also configured to automatically transition the system from the low security mode to a terminated functionality mode in response to maintenance that addresses the breach not being performed on the system within a predetermined amount of time as indicated by the count, the keypad being disabled from accepting any information in the terminated functionality mode.

15. A method, comprising:
accepting secure data input into a system via a keypad and accepting unsecure data input into the system via the keypad;
accepting data input into the system via a card reader;
in response to security of the system being compromised, terminating the acceptance of secure data input into the system via the keypad while continuing the acceptance of unsecure data input into the system and while continuing the acceptance of the data into the system via the card reader;
in response to the security of the system remaining compromised for a predetermined amount of time, terminating the acceptance of unsecure data input into the system while maintaining the termination of the acceptance of the secure data input into the system; and
in response to the security of the system being repaired within the predetermined amount of time so as to no longer be compromised, again accepting secure data input into the system via the keypad and accepting unsecure data input into the system via the keypad.

16. The method of claim 15, wherein when the acceptance of unsecure data and the acceptance of secure data is terminated, the keypad is disabled.

17. A method, comprising:
detecting a breach of security in an electronic system configured to accept payment for at least one of a good and a service;
in response to the detection of the breach, switching from a first mode of operating the system to a second mode of operating the system, the system in the first mode being configured to accept unsecure data input to the system via a keypad and to accept secure data input via the keypad, and the system in the second mode being configured to accept unsecure data input via the keypad and to disable input of secure data via the keypad;
starting a count of an amount of time when the system switches from the first mode to the second mode;
determining whether maintenance of the system occurs before the count reaches a predetermined amount of time;
switching from the second mode to the first mode in response to the maintenance of the system being determined to have occurred before the count reaches the predetermined amount of time; and
switching from the second mode to a third mode of operating the system in response to the maintenance of the system being determined to have not occurred before the count reaches the predetermined amount of time, the system in the third mode being configured to disable input of unsecure data to the system via the keypad and to disable input of secure data input to the system via the keypad.

18. The method of claim 17, wherein starting the count comprises starting a timer;
wherein the determining comprises determining whether the timer counts the predetermined amount of time.

19. The method of claim 17, further comprising, in response to the detection of the breach, displaying an indication on a display that the system is in a limited mode of operation.

20. The method of claim 19, further comprising, in response to the switch from the second mode to the third mode, changing the indication on the display to an indication that the system is nonfunctional.

21. The method of claim 17, wherein the system includes at least one of a fuel dispensing system, an unattended payment terminal configured to accept user payment for at least one of a good and a service, and an automated teller machine.

* * * * *